US011120225B2

(12) United States Patent
Tan et al.

(10) Patent No.: US 11,120,225 B2
(45) Date of Patent: Sep. 14, 2021

(54) UPDATING AN ONLINE MULTI-DOMAIN SENTENCE REPRESENTATION GENERATION MODULE OF A TEXT CLASSIFICATION SYSTEM

(71) Applicant: International Business Machines Corporation, Armonk, NY (US)

(72) Inventors: Ming Tan, Malden, MA (US); Ladislav Kunc, Prague (CZ); Yang Yu, Acton, MA (US); Haoyu Wang, Sommerville, MA (US); Saloni Potdar, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 16/267,951

(22) Filed: Feb. 5, 2019

(65) Prior Publication Data

US 2020/0250274 A1 Aug. 6, 2020

(51) Int. Cl.
*G10L 15/06* (2013.01)
*G06F 40/30* (2020.01)
*G06N 20/00* (2019.01)

(52) U.S. Cl.
CPC .......... *G06F 40/30* (2020.01); *G06N 20/00* (2019.01)

(58) Field of Classification Search
CPC .. G06F 17/2785; G06F 40/30; G06F 17/2836; G06F 3/167; G06F 17/2775; G06N 3/084; G06N 3/0454; G06N 20/00; G10L 15/063
USPC ...................................................... 704/9, 257
See application file for complete search history.

(56) References Cited

U.S. PATENT DOCUMENTS

| | | | |
|---|---|---|---|
| 7,603,330 B2 | 10/2009 | Gupta et al. | |
| 8,321,220 B1 * | 11/2012 | Chotimongkol | ...... G10L 15/063 704/257 |
| 9,336,772 B1 | 5/2016 | Salvador et al. | |
| 9,547,471 B2 * | 1/2017 | Williams | ................ G06F 3/167 |
| 9,652,453 B2 | 5/2017 | Mathur et al. | |
| 2010/0100380 A1 | 4/2010 | Tur | |
| 2016/0306794 A1 * | 10/2016 | Huang | ................ G06F 17/2836 |

(Continued)

FOREIGN PATENT DOCUMENTS

WO 2008022150 A2 2/2008

OTHER PUBLICATIONS

Crichton, Gamal, et al., "A neural network multi-task learning approach to biomedical named entity recognition", Crichton et al. BMC Bioinformatics (2017) 18:368, DOI 10.1186/s12859-017-1776-8, 14 pages.

(Continued)

*Primary Examiner* — Md S Elahee
(74) *Attorney, Agent, or Firm* — Michael A. Petrocelli

(57) ABSTRACT

An online version of a sentence representation generation module updated by training a first sentence representation generation module using first labeled data of a first corpus. After training the first sentence representation generation module using the first labeled data, a second corpus of second labeled data is obtained. The second corpus is distinct from the first corpus. A subset of the first labeled data is identified based on similarities between the first corpus and the second corpus. A second sentence representation generation module is trained using the second labeled data of the second corpus and the subset of the first labeled data.

20 Claims, 7 Drawing Sheets

(56) References Cited

U.S. PATENT DOCUMENTS

| | | |
|---|---|---|
| 2017/0032035 A1 | 2/2017 | Gao et al. |
| 2017/0308790 A1 | 10/2017 | Nogueira Dos Santos et al. |
| 2017/0372199 A1 | 12/2017 | Hakkani-Tur et al. |
| 2018/0012139 A1 | 1/2018 | Schmid et al. |
| 2018/0173808 A1 | 6/2018 | Sharma et al. |
| 2020/0242198 A1* | 7/2020 | Ji ................. G06F 17/2775 |

OTHER PUBLICATIONS

Ganin, Yaroslav, et al., "Domain-Adversarial Training of Neural Networks", Journal of Machine Learning Research 17 (2016) 1-35, 2016, 35 pages.

Hamilton, William L., et al., "DiachronicWord Embeddings Reveal Statistical Laws of Semantic Change", Association for Computational Linguistics (ACL), 2016, May 2016, 13 pages.

Liu, Pengfei, et al., "Adversarial Multi-task Learning for Text Classification", https://arxiv.org/abs/1704.05742, Accepted by ACL2017, Apr. 2017, 10 pages.

Liu, Pengfei, et al., "Recurrent Neural Network for Text Classification with Multi-Task Learning", Proceedings of the Twenty-Fifth International Joint Conference on Artificial Intelligence (IJCAI-16), Jul. 2016, 2873-2879.

Luong, Minh-Thang, et al., "Multi-Task Sequence to Sequence Learning", Published as a conference paper at ICLR 2016, 2016, 10 pages.

Naik, Azad, et al., "Classifying Documents within Multiple Hierarchical Datasets using Multi-Task Learning", 2013 IEEE 25th International Conference on Tools with Artificial Intelligence, 2013, 8 pages.

Rosenfeld, Alex, et al., "Deep Neural Models of Semantic Shift", Proceedings of NAACL-HLT 2018, 474-484.

Subramanian, Sandeep, et al., "Learning General Purpose Distributed Sentence Representations via Large Scale Multitask Learning", https://arxiv.org/abs/1804.00079, Published as a conference paper at ICLR 2018, 16 pages.

Yu, Mo, et al., "Robust Task Clustering for Deep and Diverse Multi-Task and Few-Shot Learning", https://arxiv.org/abs/1708.07918, Aug. 2017, 15 pages.

* cited by examiner

US 11,120,225 B2

UPDATING AN ONLINE MULTI-DOMAIN SENTENCE REPRESENTATION GENERATION MODULE OF A TEXT CLASSIFICATION SYSTEM

BACKGROUND

The present invention relates to machine learning, and more specifically, to machine learning-based text classification systems.

Machine learning is used in various natural language processing tasks, such as intent classification in commercial conversation or chat bot services. Machine learning-based text classification systems can be trained to effectively describe semantic relationships between words, sentences, or even documents.

Generally, using more training data to train a machine learning text classification system results in a more reliable machine learning text classification system. However, in some circumstances, such as in some commercial chat bot or intent classification systems, it can be challenging to acquire as many training examples as would be preferred. For example, when a commercial system is being prepared for a specific customer, the customer may only have a few training examples.

Assisted learning processes can be used in such circumstances to improve accuracy of the machine learning text classification system. For example, although the customer may need the machine learning text classification system to operate in a very specific domain, a more generic or multi-domain text classification system can be trained using domain-specific training examples provided by the customer.

SUMMARY

According to an embodiment of the present invention, a computer-implemented method of updating a multi-domain sentence representation generation module of a text classification system includes training a first multi-domain sentence representation generation module using first labeled data of a first corpus. The computer-implemented method also includes, after training the first multi-domain sentence representation generation module using the first labeled data, obtaining a second corpus of second labeled data, where the second corpus is distinct from the first corpus. The computer-implemented method further includes identifying a subset of the first labeled data based on similarities between the first corpus and the second corpus. The computer-implemented method also includes training a second multi-domain sentence representation generation module of the text classification system using the second labeled data of the second corpus and the subset of the first labeled data.

According to an embodiment of the present invention, a system for updating a multi-domain sentence representation generation module of a text classification system includes one or more processors and one or more memory devices coupled to the one or more processors. The one or more memory devices store instructions that are executable by the one or more processors to perform operations. The operations include training a first multi-domain sentence representation generation module using first labeled data of a first corpus. The operations also include, after training the first multi-domain sentence representation generation module using the first labeled data, obtaining a second corpus of second labeled data, where the second corpus is distinct from the first corpus. The operations further include identifying a subset of the first labeled data based on similarities between the first corpus and the second corpus. The operations also include training a second multi-domain sentence representation generation module using the second labeled data of the second corpus and the subset of the first labeled data.

According to an embodiment of the present invention, a computer program product for updating a multi-domain sentence representation generation module of a text classification system includes a computer readable storage medium having program instructions embodied therewith. The program instructions are executable by one or more processors to perform operations. The operations include training a first multi-domain sentence representation generation module using first labeled data of a first corpus. The operations also include, after training the first multi-domain sentence representation generation module using the first labeled data, obtaining a second corpus of second labeled data, where the second corpus is distinct from the first corpus. The operations further include identifying a subset of the first labeled data based on similarities between the first corpus and the second corpus. The operations also include training a second multi-domain sentence representation generation module of the text classification system using the second labeled data of the second corpus and the subset of the first labeled data.

DETAILED DESCRIPTION

Figure 1:
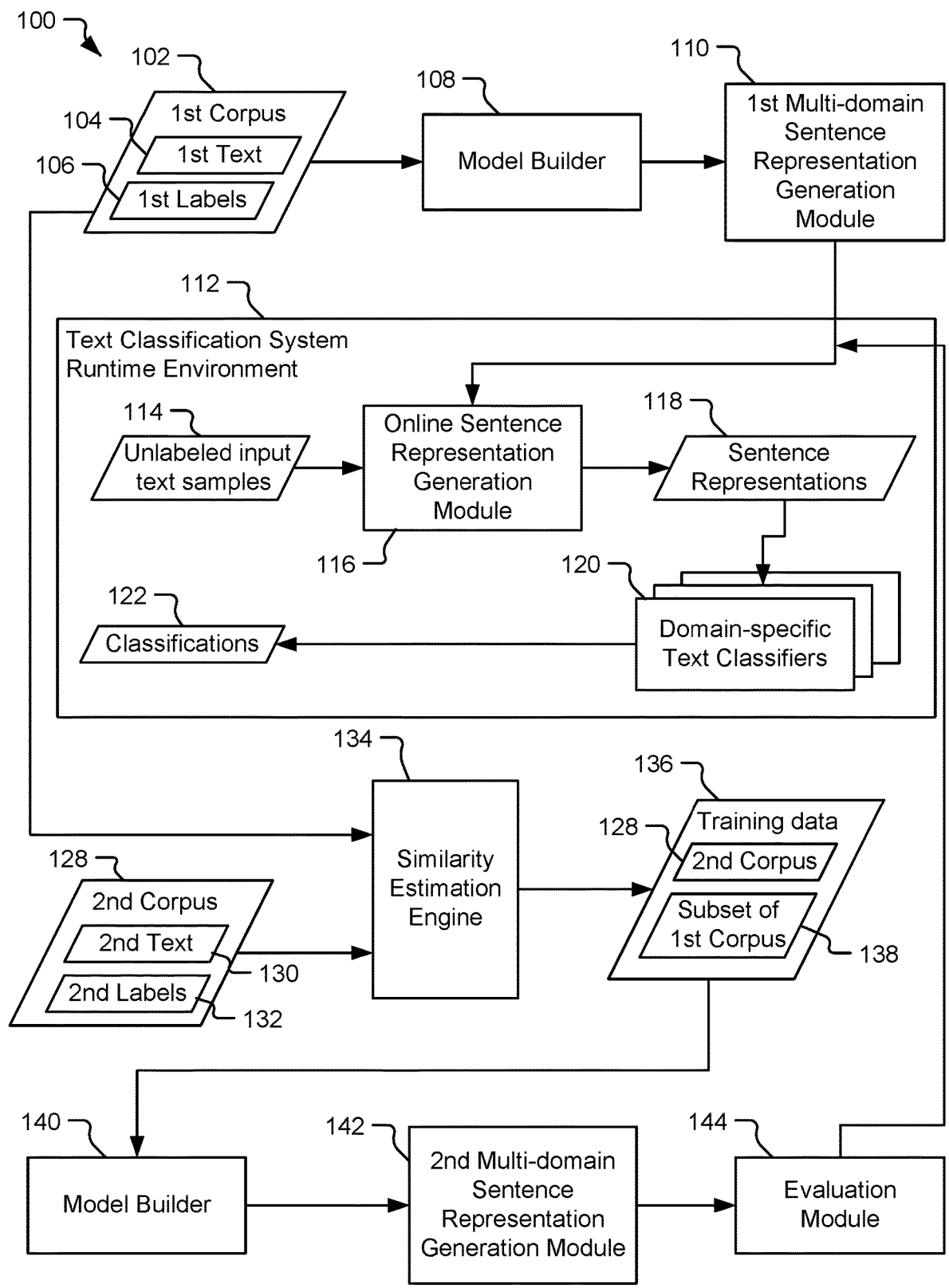
FIG. 1 is a diagram that illustrates an example of updating an online multi-domain sentence representation generation module of a text classification system according to an embodiment of the present invention.

A life-cycle framework to facilitate updating a multi-domain sentence representation generation module of a text classification system is described herein. The multi-domain sentence representation generation module can be trained and updated using multi-task learning. In a particular implementation, an initial multi-domain sentence representation generation module can be generated using a set of labeled data (e.g., an initial corpus). The initial corpus can represent multiple workspaces (e.g., semantic categories or domains) using utterance-intent label pairs. The initial multi-domain sentence representation generation module can be used to generate sentence representations for multiple domain-specific text classifiers to classify unlabeled utterances. For example, each client, customer, or other user of the text classification system can be associated with one or more domain-specific text classifiers. In this example, an online version of the multi-domain sentence representation generation module generates sentence representations for each of the multiple domain-specific text classifiers based on input text, and the domain-specific text classifiers generate classification labels (e.g., intent labels) for the input text based on the sentence representations. The multi-domain sentence representation generation module is trained using multitask learning to provide sentence representations that can be used to generate accurate classification results across multiple distinct domains.

The life-cycle framework enables dynamic adaptation of the multi-domain sentence representation generation module by generating a new or updated multi-domain sentence representation generation module (e.g. a second multi-domain sentence representation generation module) based on a second corpus that is provided after the initial multi-domain sentence representation generation module is released into production (e.g., made available to clients). For example, the initial corpus can include fewer training examples for a particular domain (or fewer training examples overall) than is desirable to train a reliable multi-domain sentence representation generation module, in which case the second corpus can include additional examples that become available after the initial multi-domain sentence representation generation module is put into use. The second corpus can include additional utterance-intent labeled pairs. The second corpus can be combined with portions of the first corpus to generate training data for the second multi-domain sentence representation generation module. For example, a subset of the first corpus that includes utterances that are semantically similar to utterances of the second corpus can be combined with the second corpus to generate the training data.

The second multi-domain sentence representation generation module can be evaluated, e.g., by one or more clients, to determine whether the second multi-domain sentence representation generation module is acceptable. For example, the second multi-domain sentence representation generation module may be acceptable if the second multi-domain sentence representation generation module provides sentence representations that enable one or more domain-specific classifiers to generate more accurate classification results for particular test data. In some implementation, such as where the text classification system is available to multiple distinct clients, a voting process (e.g., a weighted voting process) can be used to determine whether the second multi-domain sentence representation generation module is acceptable. If the second multi-domain sentence representation generation module is acceptable, the second multi-domain sentence representation generation module replaces the initial multi-domain sentence representation generation module as the online version of the multi-domain sentence representation generation module.

FIG. 1 is a diagram that illustrates an example of updating a multi-domain sentence representation generation module according to an embodiment of the present invention. FIG. 1 shows an example of at least a portion of a text classification system 100. In FIG. 1, the text classification system 100 includes an online version of a sentence representation generation module 116 and multiple domain-specific text classifiers 120 in a runtime environment 112 of the text classification system 100. Additionally, the text classification system 100 includes various functional modules to enable updating the online version of the sentence representation generation module 116 based on additional labeled training data, as described further below. For example, the text classification system 100 includes one or more model builders (e.g., model builders 108 and 140), a similarity estimation engine 134, and an evaluation module 144. Various data generated, processed, or output by portions of the text classification system 100 are illustrated to facilitate description.

In a particular implementation, each of the various functional modules of the text classification illustrated in FIG. 1 corresponds to hardware. For example, the runtime environment 112, the one or more model builders 108 and 140, the similarity estimation engine 134, and the evaluation module 144 may be embodied in a processor, a controller, a field-programmable gate array (FPGA), an application-specific integrated circuit (ASIC), or another form of hardware. In other implementations, the operations described with reference to the various functional modules of FIG. 1 are performed by a processor (or more than one processor) executed computer-readable instructions, as further described with reference to FIG. 7.

As used herein, a multi-domain sentence representation generation module is a machine learning model, such as a neural network, that is trained to generate a vector representing an input text sample. As used herein, the vector representing the input text sample is referred to as a sentence representation. However, it should be noted that the input text sample need not be a complete sentence. Rather, the input text sample can include a document (e.g., one or more paragraphs, each including multiple sentences), one or more sentences, a sentence fragment (e.g., a phrase or grammatically unstructured set of words), or even, in some contexts, a single word. The multi-domain sentence representation generation module is a type of embedding network, and the sentence representations generated by the multi-domain sentence representation generation module are embedding vectors. As a specific example, the multi-domain sentence representation generation module can include a convolutional neural network with max pooling that can be trained using labeled training data and backpropagation or other training techniques to generate an embedding vector (i.e., a sentence representation) that is a reduced dimensionality representation of an input.

After a multi-domain sentence representation generation module is trained, the multi-domain sentence representation generation module can be used to generate a sentence representation (also called an "embedding") based on an input text sample. The sentence representation can be visualized of as representing a point in a feature space (also referred to as an "embedding space"), where two points that are near each other in the feature space are more similar to one another than are two points that are further away from each other.

In the runtime environment 112 of the text classification system 100, a text sample (e.g., an unlabeled input text sample 114) is received from a user (e.g., a user of a chat bot service) and provided to the online version of the sentence representation generation module 116. The online version of the sentence representation generation module 116 generates a sentence representation 118 based on the unlabeled input text sample 114. The sentence representation 118 is provided as input to one or more domain-specific text classifiers 120. For example, a chat bot service that received the text sample from the user can be associated with a particular client or customer of the text classification system 100, and the sentence representation 118 can be provided as input to the domain-specific text classifier 120 associated with the particular client or customer. The domain-specific text classifier 120 generates a classification result 122, such as an intent label indicating an intent of the user based on the text sample. The classification result 122 can be used to generate a response to the text sample, to direct the user to requested information, or for other purposed depending on the specific needs of the clients or customers of the text classification system 100.

Over time new clients or customers can be added to the text classification system 100, old clients or customers can acquire additional training data samples, which can be related to new semantic domains or can overlap with old semantic domains, or other changes can occur such that merit updating the online version of the sentence representation generation module 116. The online version of the sentence representation generation module 116 can be updated based at least in part on a second corpus 128, as described further below.

As used herein, a model builder (e.g., the model builders 108 or 140) includes or corresponds to a machine learning system (or executable instructions to implement a machine learning system) to generate and/or train a machine learning model, such as an embedding network. Two model builders 108 and 140 are illustrated in FIG. 1; however, in some implementations, a single model builder can be used rather than using two distinct model builders 108 and 140. The model builder(s) 108, 140 can include software or other executable code to specify the structure of the embedding network (e.g., a number and arrangement of node, links, and/or layers, initial link weights, activation functions use by nodes, bias weights, etc.). In a particular implementation, the model builder(s) 108, 140 can include software or other executable code to train multi-domain sentence representation generation modules based on training data sets (e.g., labeled training data) using back propagation or another machine learning training technique (e.g., a genetic algorithm).

The similarity estimation engine 134 includes or corresponds to software or other executable code to evaluate similarities between data sets. As a specific example, in the context of the text classification system 100, the similarity estimation engine 134 can determine how similar a text sample of a first corpus 102 is to a text sample of a second corpus 128. To illustrate, the similarity estimation engine 134 can use a learn-to-rank or other information retrieval process to identify similarities between the first corpus 102 and the second corpus 128.

The similarity estimation engine 134 can generate training data 136, which the model builder 140 uses to train a second multi-domain sentence representation generation module 142. The training data 136 can include the second corpus 128 and a subset 138 of the first corpus 102 that the similarity estimation engine 134 identifies as similar to the second corpus 128. After the second multi-domain sentence representation generation module 142 is trained, the evaluation module 144 performs operations to determine whether the second multi-domain sentence representation generation module 142 is acceptable, as described further below.

In operation, the text classification system 100 of FIG. 1 obtains a first corpus 102, which includes first text samples 104 and first labels 106 corresponding to the first text samples 104. The first text samples 104 and first labels 106 together can also be referred to as "first labeled data". The first text samples 104 are provided as input to the model builder 108 to generate the first multi-domain sentence representation generation module 110. In the example illustrated in FIG. 1, the first multi-domain sentence representation generation module 110 is provided to the runtime environment 112 for use as the online version of the sentence representation generation module 116. In the runtime environment 112 (also referred to as a production environment), the online version of the sentence representation generation module 116 can be used to generate the sentence representations 118 that are provided as input to the domain-specific text classifiers 120 to generate classification results 122 based on the unlabeled input text samples 114.

Sometime after the first multi-domain sentence representation generation module 110 is trained, a second corpus 128 can be obtained. The second corpus 128 includes second text samples 130 and second labels 132 corresponding to the second text samples 130. The second corpus 128 is distinct from the first corpus 102. For example, the second corpus 128 can include additional samples pertaining to a particular domain that is represented in the first corpus 102. To illustrate, the first corpus 102 can include labeled data samples that pertain to a first domain, and the second corpus 128 can include additional labeled data samples that pertain to the first domain. Alternatively, or in addition, the second corpus 128 can include text samples pertaining to one or more domains that are not represented in the first corpus 102. To illustrate, the first corpus 102 can include labeled data samples that pertain to a first set of domains, and the second corpus 128 can include additional labeled data samples that pertain to one or more domains that are not in the first set of domains. In this illustration, the first text samples 104 of the first corpus 102 are related to first semantic domains, and the second text samples 130 of the second corpus 128 are related to second semantic domains. In this illustration, the first and second semantic domains are not coextensive. For example, the first and second semantic domains can be non-overlapping, partially overlapping, or one of the semantic domains can be a subset of the other semantic domain.

After the second corpus 128 is obtained, the similarity estimation engine 134 identifies a subset 138 of the first corpus 102 based on similarities between the first corpus 102 and the second corpus 128. For example, in FIG. 1, the first and second text samples 104 and 130 can be mapped into an embedding space (also referred to as a feature space). The similarity (or dissimilarity) of text samples can be estimated based on the distance between the corresponding two points in the embedding space. In a particular implementation, the similarity estimation engine 134 computes a similarity metric (such as cosine similarity), based on the distance in embedding space, for each pair of text samples, where each pair includes a text sample from the first corpus 102 and a text sample from the second corpus 128. The similarity estimation engine 134 selects as the subset 138 of the first corpus 102 those first text samples 104 that are most similar to (e.g., closest in the embedding space to) the second text samples 130.

The text classification system 100 (e.g., the similarity estimation engine 134 or another module) combines the second corpus 128 and the subset 138 of the first corpus 102 to form the training data 136. The training data 136 are provided as input to the model builder 140 to generate and train the second multi-domain sentence representation generation module 142.

In some implementations, after the second multi-domain sentence representation generation module 142 is trained, the second multi-domain sentence representation generation module 142 is added to the runtime environment 112 as a second online version of the sentence representation generation module 116. Alternatively, the second multi-domain sentence representation generation module 142 can replace the first multi-domain sentence representation generation module 110 as the online version of the sentence representation generation module 116. In some implementations, the text classification system 100 includes an evaluation module 144 configured to determine whether the second multi-domain sentence representation generation module 142 satisfies an acceptance criterion. If the second multi-domain sentence representation generation module 142 satisfies the acceptance criterion, the second multi-domain sentence representation generation module 142 can be used in the runtime environment 112 (e.g., with or instead of the first multi-domain sentence representation generation module 110).

As an example, the evaluation module 144 can evaluate the second multi-domain sentence representation generation module 142 using a test data set (not shown). In this example, the evaluation module 144 determines a performance metric indicating classification accuracy of one or more of the domain-specific text classifiers 120 using sentence representations generated by the second multi-domain sentence representation generation module 142. The second multi-domain sentence representation generation module 142 can satisfy the acceptance criterion if the performance metric is greater than or equal to a classification accuracy threshold value. Alternatively, the second multi-domain sentence representation generation module 142 can satisfy the acceptance criterion if the performance metric of the second multi-domain sentence representation generation module 142 is greater than (or greater than or equal to) a performance metric that indicates classification accuracy of the domain-specific text classifiers 120 using the sentence representations 118 generated by the first multi-domain sentence representation generation module 110 (or generated by the online version of the sentence representation generation module 116).

In some implementations, such as where the text classification system 100 is generated by or operated by a first entity (e.g., a service provider) that provides services to one or more other entities (e.g., customers) associated with the domain-specific text classifiers 120, the one or more other entities can evaluate the second multi-domain sentence representation generation module 142 to determine whether to accept the second multi-domain sentence representation generation module 142 in the runtime environment 112. As a specific example, after the second multi-domain sentence representation generation module 142 is trained, the evaluation module 144 can provide the second multi-domain sentence representation generation module 142 to a plurality of independent entities for evaluation. Each of the independent entities can provide an evaluation result in the form of a vote indicating acceptance of or rejection of the second multi-domain sentence representation generation module 142. For example, the evaluation module 144 can receive first voting data indicating acceptance of or rejection of the second multi-domain sentence representation generation module 142 from a first entity of the plurality of independent entities and can receive second voting data indicating acceptance of or rejection of the second multi-domain sentence representation generation module 142 from a second entity of the plurality of independent entities. The evaluation module 144 can count votes indicated by the voting data to determine whether to put the second multi-domain sentence representation generation module 142 into production in the runtime environment 112.

In some implementations, the evaluation module 144 can use a weighted voting scheme to accept or reject the second multi-domain sentence representation generation module 142. For example, the evaluation module 144 can apply a first weight value to the first voting data (from the first entity the plurality of independent entities) to generate a first weighted vote and can apply a second weight value to the second voting data (from the second entity the plurality of independent entities) to generate a second weighted vote. In this example, the first entity is distinct from the second entity and the first weight value is different than the second weight value. The evaluation module 144 can determine weighted voting data based on the first weighted vote and the second weighted vote and can determine whether to accept or reject the second multi-domain sentence representation generation module 142 based on the weighted voting data. To illustrated, the weighted voting data can be compared to an acceptance threshold to determine whether to accept the second multi-domain sentence representation generation module 142. In this example, each entity of the plurality of independent entities can be associated with a corresponding weight value. The weight values can be determined based on, for example, a use metric value indicative of how much use each entity has associated with the online version of the sentence representation generation module 116. To illustrate, the amount of use each entity has associated with the online version of the sentence representation generation module 116 can be determined as a count of the number of the unlabeled input text samples 114 that are associated with each entity. Alternatively, the weight value associated with each entity can be determined based on how long each entity has been a customer of the text classification system 100 or based on a service level agreement of each entity.

After the evaluation module 144 evaluates the second multi-domain sentence representation generation module 142, the evaluation module 144 (or another component of the text classification system 100) selects, for subsequent use in the runtime environment 112, the first multi-domain sentence representation generation module 110, the second multi-domain sentence representation generation module 142, or both. The operations illustrated in FIG. 1 and described above can subsequently be repeated to generate one or more additional multi-domain sentence representation generation modules. For example, a third multi-domain sentence representation generation module can be trained based on training data that includes a third corpus as well at least a subset of the second corpus 128 (and, optionally, a subset of the first corpus 102). Thus, the text classification system 100 is able to update a multi-domain sentence representation generation module used by the domain-specific text classifiers 120 in the runtime environment 112 based on changing customer needs, based on availability of further training text samples, etc.

Figure 2:
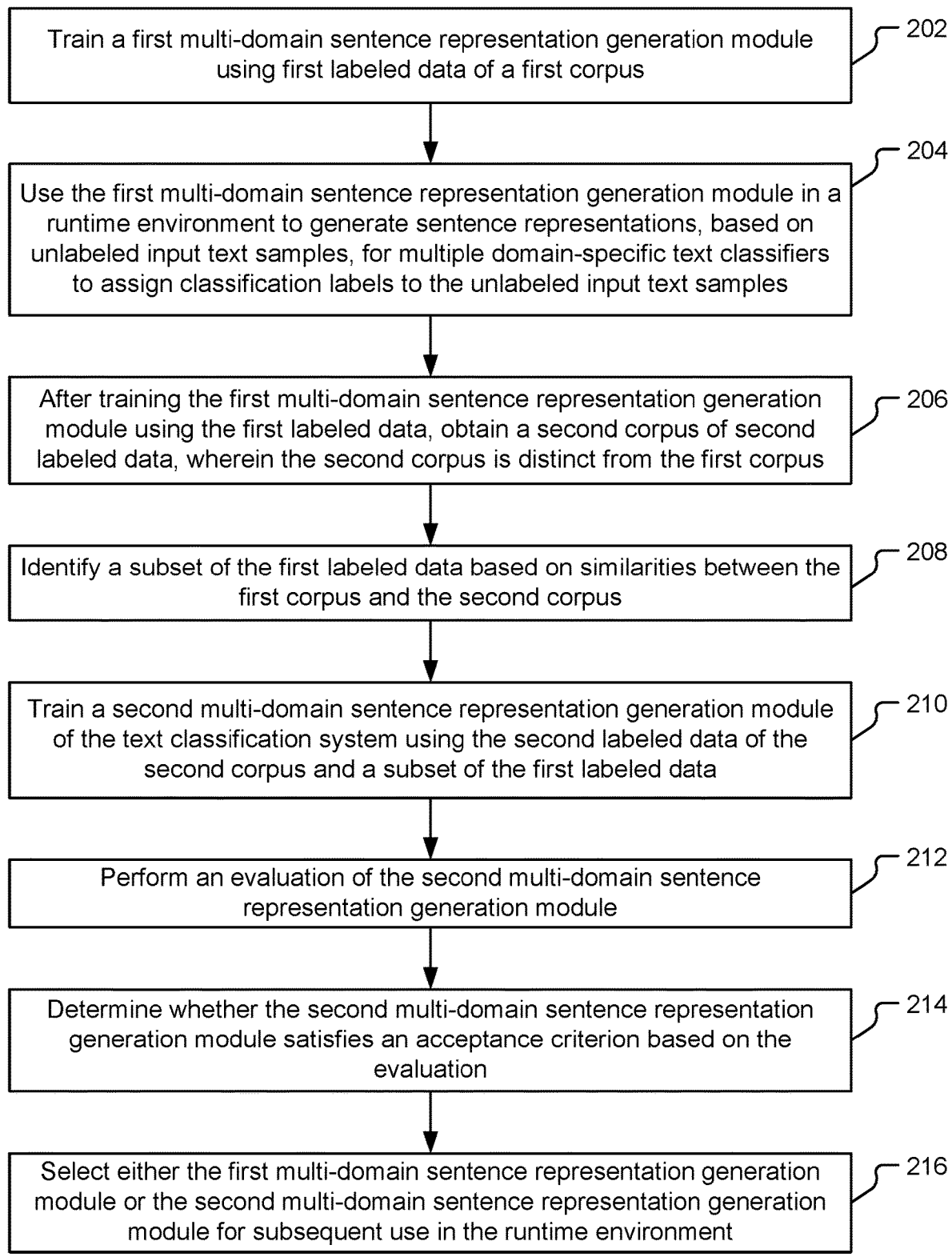
FIG. 2 is a flowchart that illustrates an example of a method of updating an online multi-domain sentence representation generation module of a text classification system according to an embodiment of the present invention.

FIG. 2 is a flowchart that illustrates an example of a method of updating an online multi-domain sentence representation generation module of a text classification system according to an embodiment of the present invention. The computer-implemented method illustrated in FIG. 2 is performed by one or more processors executing instructions from one or more memory devices.

At 202, the one or more processors train a first multi-domain sentence representation generation module using first labeled data of a first corpus. Training the first multi-domain sentence representation generation module can include, for example, determining a first plurality of model parameters of embedding layers of a neural network using multi-task learning techniques. For example, the model builder 108 of FIG. 1 trains the first multi-domain sentence representation generation module 110 based on the first text samples 104 and the corresponding first labels 106 of the first corpus 102.

At 204, the one or more processors use the first multi-domain sentence representation generation module in a runtime environment to generate sentence representations, based on unlabeled input text samples, for multiple domain-specific text classifiers to assign classification labels to the unlabeled input text samples. For example, in FIG. 1, the first multi-domain sentence representation generation module 110 is used in the runtime environment 112 as the online version of the sentence representation generation module 116. The online version of the sentence representation generation module 116 receives the unlabeled input text samples 114 and generates the sentence representations 118. The sentence representations 118 are provided as input to the domain-specific text classifiers 120 to generate the classification results 122 based on the unlabeled input text samples 114.

At 206, after training the first multi-domain sentence representation generation module using the first labeled data, the one or more processors obtain a second corpus of second labeled data. The second corpus is distinct from the first corpus. The second corpus can be obtained via user input or from a memory of the one or more memory devices.

At 208, the one or more processors identify a subset of the first labeled data based on similarities between the first corpus and the second corpus. For example, the similarity estimation engine 134 of FIG. 1 can determine similarities between the first corpus 102 and the second corpus 128.

At 210, the one or more processors train a second multi-domain sentence representation generation module of the text classification system using the second labeled data of the second corpus and a subset of the first labeled data. The subset of the first labeled data is selected based on the similarities between the first corpus 102 and the second corpus 128. For example, the similarity estimation engine 134 can generate the training data 136, which includes the second corpus 128 and the subset 138 of the first corpus 102, based on the similarities between the first corpus 102 and the second corpus 128. The model builder 140 can generate and train the second multi-domain sentence representation generation module 142 based on the training data 136.

At 212, the one or more processors perform an evaluation of the second multi-domain sentence representation generation module, and at 214, determine whether the second multi-domain sentence representation generation module satisfies an acceptance criterion based on the evaluation. To illustrate, the evaluation module 144 of FIG. 1 can evaluate of the second multi-domain sentence representation generation module 142 to determine whether the second multi-domain sentence representation generation module 142 satisfies an acceptance criterion. As a first example, the evaluation module 144 can use a test data set to generate a performance metric indicating classification accuracy of a first domain-specific text classifier of the multiple domain-specific text classifiers 120 using sentence representations from the second multi-domain sentence representation generation module 142. In this first example, the acceptance criterion is satisfied when the performance metric satisfies a classification accuracy threshold. Alternatively, in the first example, the evaluation module 144 can provide the second multi-domain sentence representation generation module 142 or one or more sentence representations generated by the second multi-domain sentence representation generation module 142 to the domain-specific text classifiers 120, and the domain-specific text classifiers 120 can generate the performance metric (or multiple performance metrics, e.g., one for each of the domain-specific text classifiers 120) for comparison to the classification accuracy threshold.

As a second example, the evaluation module 144 can use the test data set to generate a first performance metric indicating classification accuracy of a first domain-specific text classifier of the multiple domain-specific text classifiers 120 using first sentence representations from the first multi-domain sentence representation generation module 110. In this example, the evaluation module 144 can also use the test data set to generate a second performance metric indicating classification accuracy of the first domain-specific text classifier using second sentence representations from the second multi-domain sentence representation generation module 142. The evaluation module 144 can determine whether the acceptance criterion is satisfied by comparing the first performance metric and the second performance metric. To illustrate, the acceptance criterion can be satisfied when the second performance metric is greater than or equal to the first performance metric.

Alternatively, in the second example above, the evaluation module 144 can provide the second multi-domain sentence representation generation module 142 or one or more sentence representations generated by the second multi-domain sentence representation generation module 142 to the domain-specific text classifiers 120, and the domain-specific text classifiers 120 can generate the first and second performance metrics (or multiple first and multiple second performance metrics, e.g., one first and one second performance metric for each of the domain-specific text classifiers 120) for comparison.

In a third example, the evaluation module 144 can determine whether the second multi-domain sentence representation generation module satisfies the acceptance criterion can be based on a voting scheme. In this example, multiple entities (e.g., distinct and/or independent customers of the text classification system 100) can vote on whether to accept the second multi-domain sentence representation generation module. In this example, the second multi-domain sentence representation generation module satisfies the acceptance criterion if a sufficient number or a sufficient proportion of the entities vote to accept the second multi-domain sentence representation generation module. The vote can be evaluated based on a weighted voting scheme in which votes from different entities are weighted differently.

At 216, the one or more processors select, based on whether the second multi-domain sentence representation generation module satisfies the acceptance criterion, either the first multi-domain sentence representation generation module or the second multi-domain sentence representation generation module for subsequent use in the runtime environment. For example, if the second multi-domain sentence representation generation module 142 of FIG. 1 satisfies the acceptance criterion, the second multi-domain sentence representation generation module 142 can replace the first multi-domain sentence representation generation module 110 in the runtime environment 112 as the online version of the sentence representation generation module 116.

Figure 3:
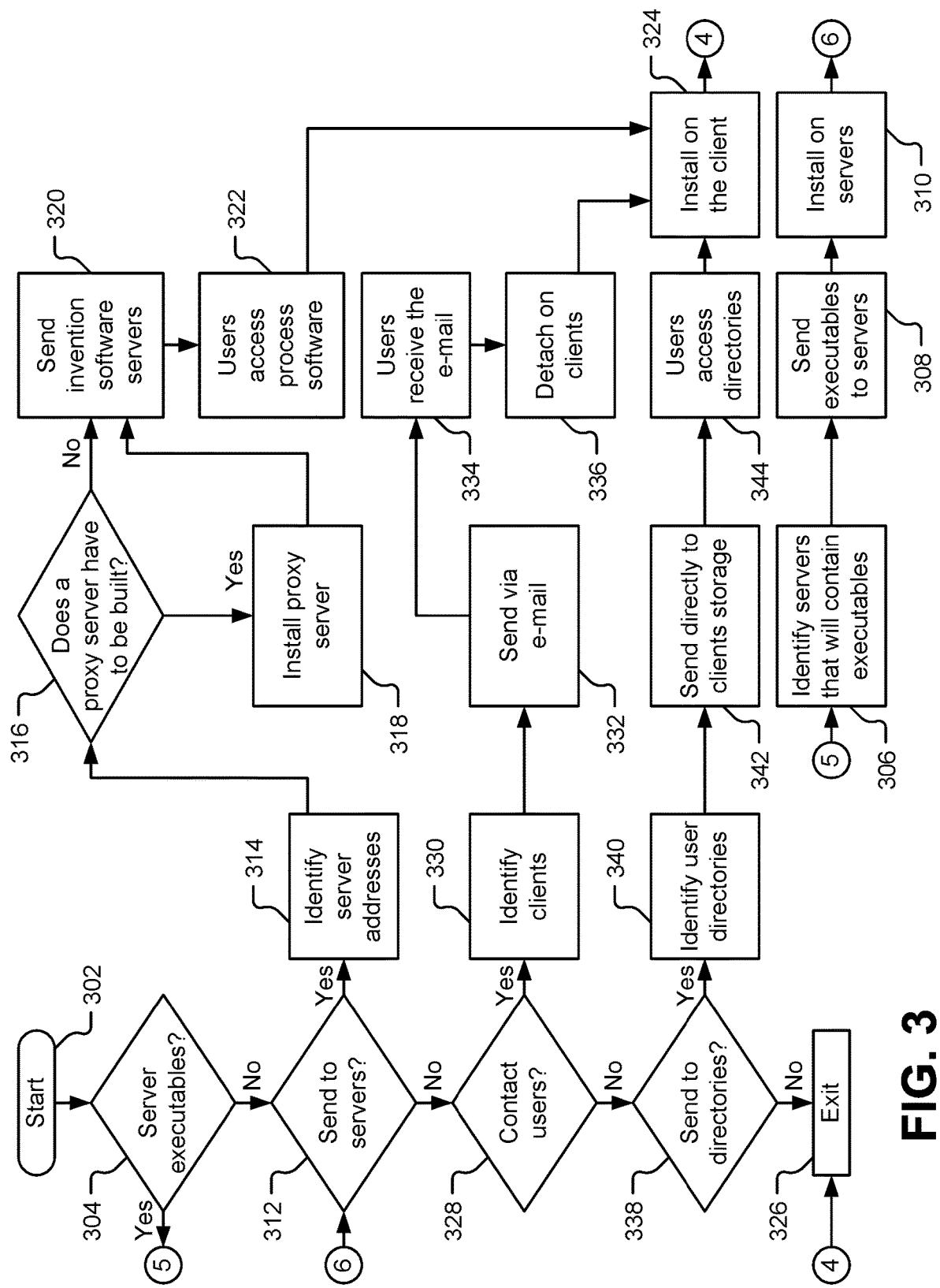
FIG. 3 is a flowchart that illustrates an example of a method of deploying a multi-domain sentence representation generation module of a text classification system according to an embodiment of the present invention.

FIG. 3 is a flowchart that illustrates an example of a method of deploying a text classification system or an updated version of an online multi-domain sentence representation generation module of the text classification system according to an embodiment of the present invention. While it is understood that process software of the text classification system (such as the online version of the sentence representation generation module 116 of FIG. 1) may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 302 begins the deployment of the process software. An initial step is to determine if there are any programs that will reside on a server or servers when the process software is executed (304). If this is the case, then the servers that will contain the executables are identified (306). The process software for the server or servers is transferred directly to the servers' storage via FTP or some other protocol or by copying though the use of a shared file system (308). The process software is then installed on the servers (310).

Next, a determination is made on whether the process software is to be deployed by having users access the process software on a server or servers (312). If the users are to access the process software on servers, then the server addresses that will store the process software are identified (314).

A determination is made if a proxy server is to be built (316) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (318). The process software is sent to the (one or more) servers either via a protocol such as FTP, or it is copied directly from the source files to the server files via file sharing (320). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (322). Another embodiment is to have the servers automatically copy the process software to each client and then run the installation program for the process software at each client computer. The user executes the program that installs the process software on his client computer (324) and then exits the process (326).

In step 328 a determination is made whether the process software is to be deployed by sending the process software to users via e-mail. The set of users where the process software will be deployed are identified together with the addresses of the user client computers (330). The process software is sent (332) via e-mail to each of the users' client computers. The users then receive the e-mail (334) and then detach the process software from the e-mail to a directory on their client computers (336). The user executes the program that installs the process software on his client computer (324) and then exits the process (326).

Lastly, a determination is made on whether the process software will be sent directly to user directories on their client computers (338). If so, the user directories are identified (340). The process software is transferred directly to the user's client computer directory (342). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (344). The user executes the program that installs the process software on his client computer (324) and then exits the process (326).

Figure 4:
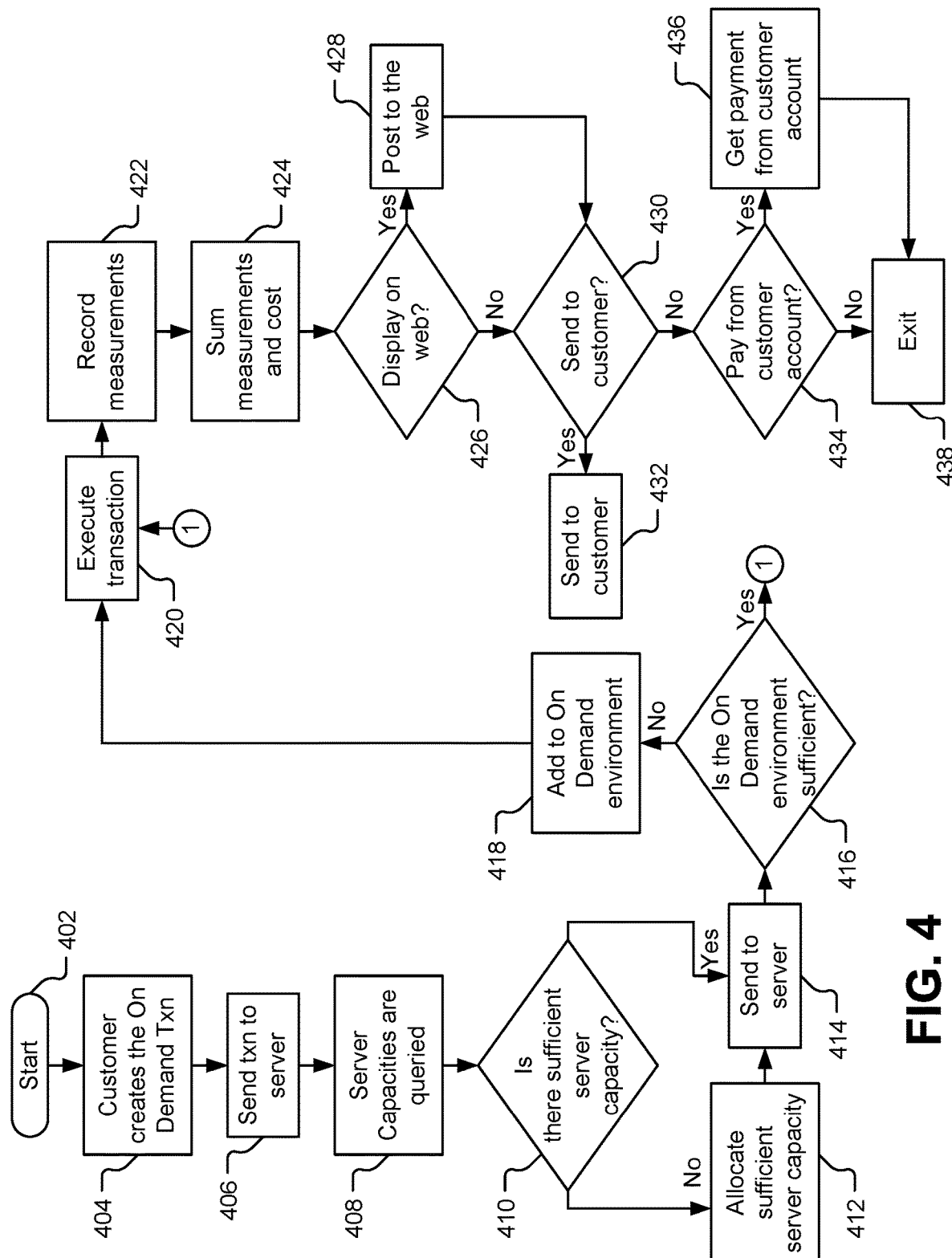
FIG. 4 is a flowchart that illustrates an example of a method of using a multi-domain sentence representation generation module of a text classification system in an on demand context according to an embodiment of the present invention.

FIG. 4 is a flowchart that illustrates an example of a method of using a text classification system or on online version of a multi-domain sentence representation generation module in an on demand context according to an embodiment of the present invention. In FIG. 4, the process software of the text classification system 100 (such as the online version of the sentence representation generation module 116) is shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload.

The measurements of use employed for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and/or indicated on a web site accessed by the customer, who may then remit payment to the service provider. The measurements of use can also be used to determine voting weight values.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Step 402 begins the On Demand process. A transaction is created that contains the unique customer identification, the requested service type, and any service parameters that further specify the type of service (404). The transaction is then sent to the main server (406). In an On Demand environment, the main server can initially be the only server, and then as capacity is consumed other servers are added to the On Demand environment.

The server central processing unit (CPU) capacities in the On Demand environment are queried (408). The CPU requirement of the transaction is estimated, and then the server's available CPU capacity in the On Demand environment is compared to the transaction CPU requirement to see if there is sufficient CPU available capacity in any server to process the transaction (410). If there is not sufficient server CPU available capacity, then additional server CPU capacity is allocated to process the transaction (412). If there was already sufficient available CPU capacity, then the transaction is sent to a selected server (414).

Before executing the transaction, a check is made of the remaining On Demand environment to determine if the environment has sufficient available capacity for processing the transaction. This environment capacity consists of such things as, but not limited to, network bandwidth, processor memory, storage etc. (416). If there is not sufficient available capacity, then capacity will be added to the On Demand environment (418). Next the required software to process the transaction is accessed, loaded into memory, and then the transaction is executed (420).

The usage measurements are recorded (422). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs, and then recorded as a charge to the requesting customer (424).

If the customer has requested that the On Demand costs be posted to a web site (426), then they are posted thereto (428). If the customer has requested that the On Demand costs be sent via e-mail to a customer address (430), then they are sent (432). If the customer has requested that the On Demand costs be paid directly from a customer account (434), then payment is received directly from the customer account (436). On Demand process proceeds to 438 and exits.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
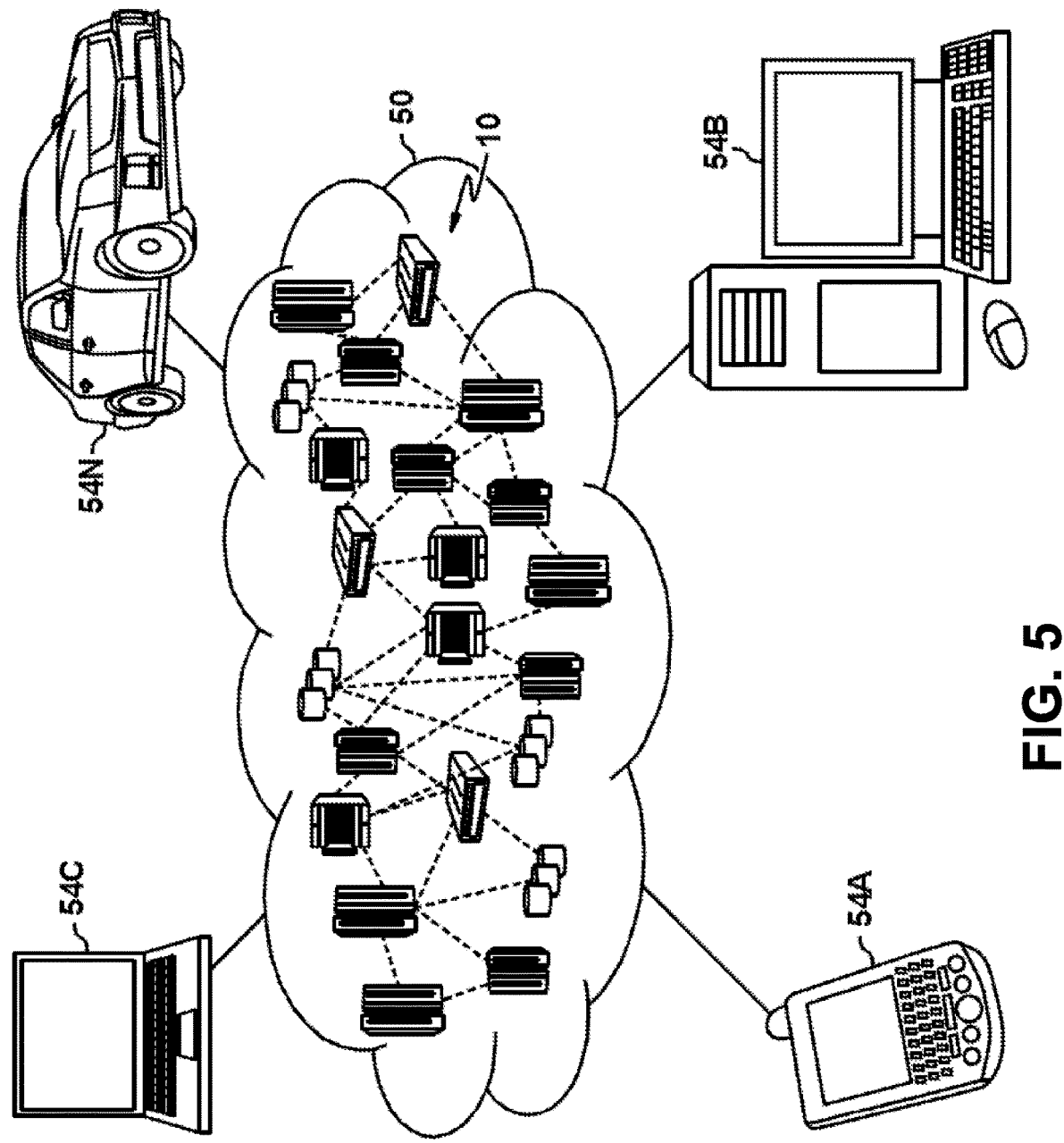
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
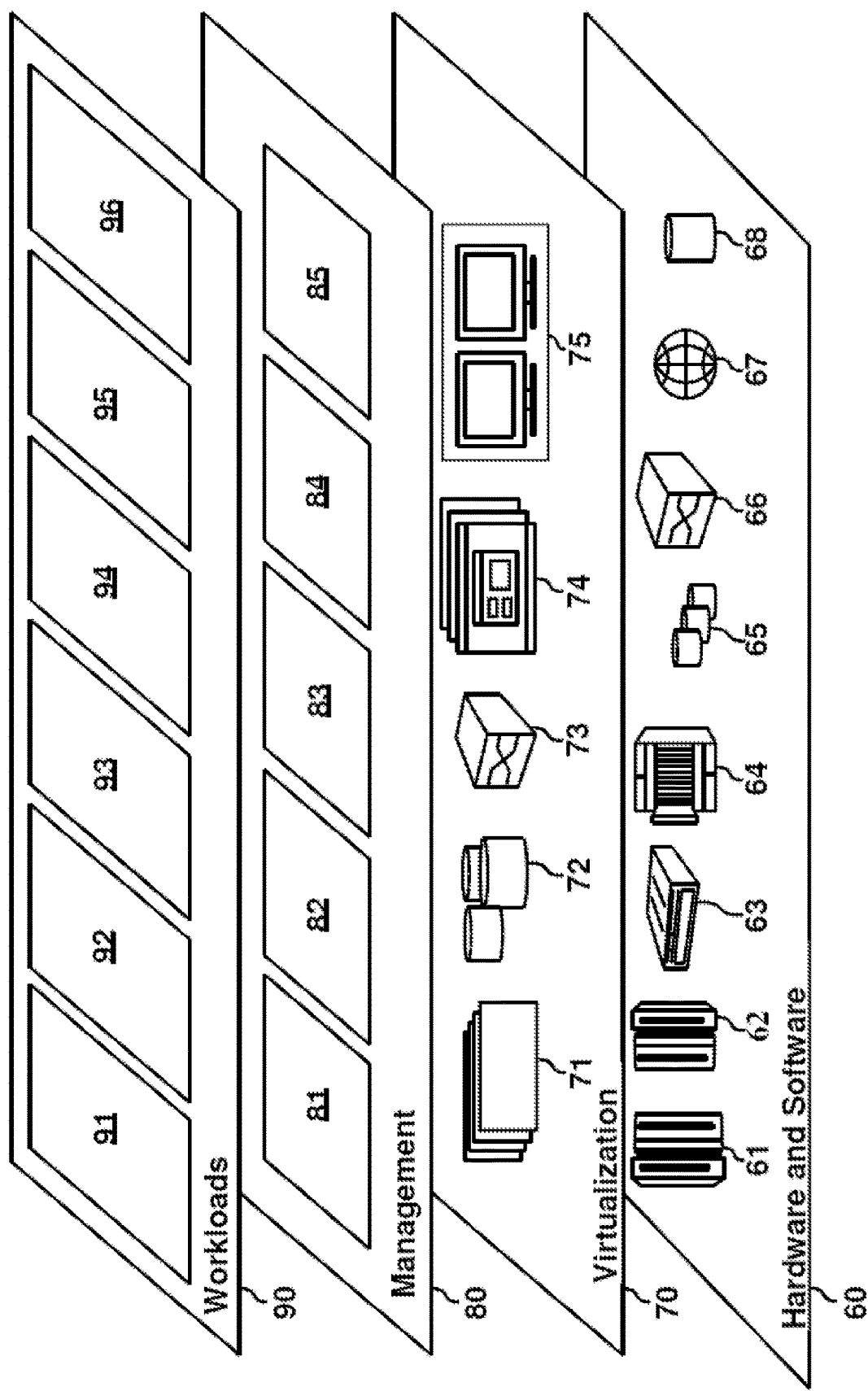
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 associated with the text classification system 100 of FIG. 1.

Figure 7:
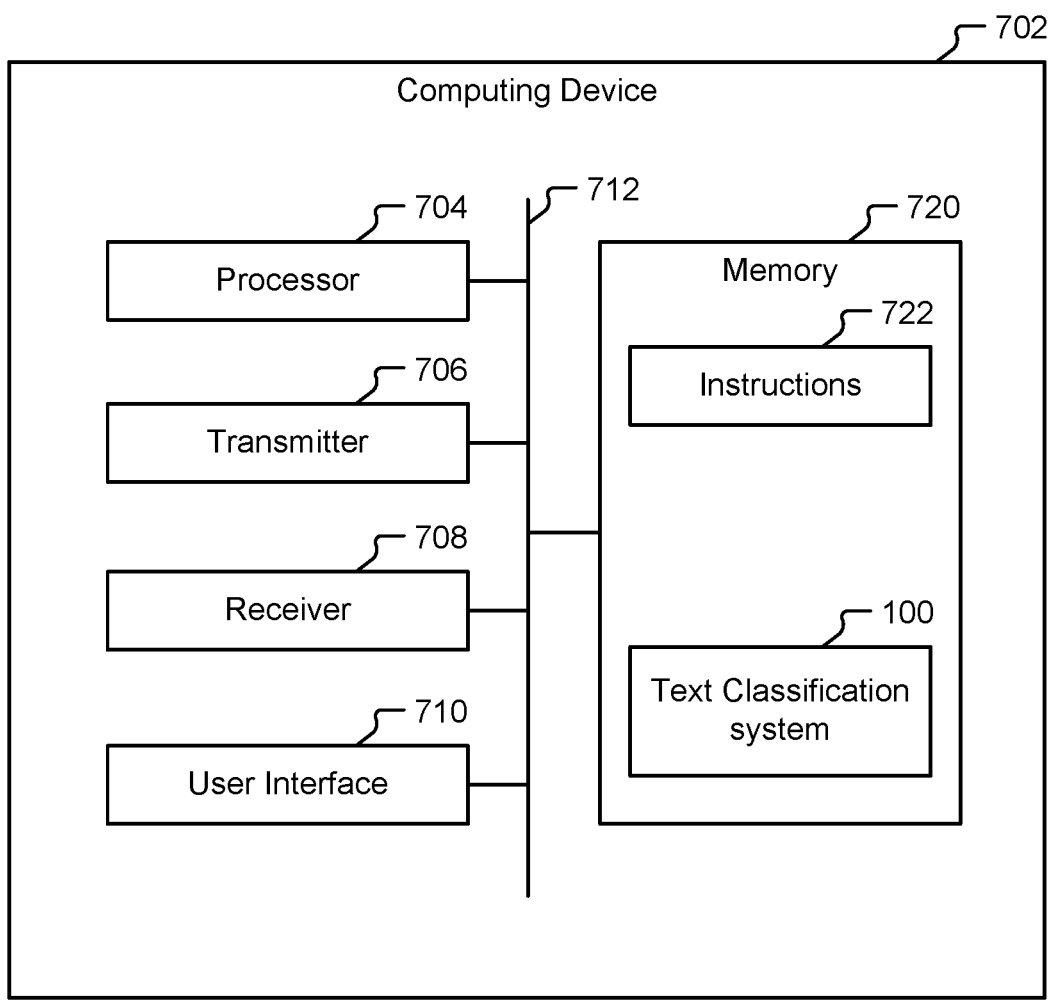
FIG. 7 illustrates a diagram of a computing device configured to update a multi-domain sentence representation generation module of a text classification system.

FIG. 7 illustrates a diagram of a computing device 702 configured to update a multi-domain sentence representation generation module of a text classification system. The computing device 702 may include or correspond to a desktop computer, a laptop computer, a tablet computer, a server, a mainframe, or any other type of computing device.

The computing device includes a processor 704, a transmitter 706, a receiver 708, a user interface 710, and a memory 720. The processor 704, the transmitter 706, the receiver 708, the user interface 710, and the memory 720 may be coupled together via a bus 712 (or another connection). The example illustrated in FIG. 7 is not intended to be limiting, and in other implementations, one or more of the processor 704, the transmitter 706, the receiver 708, the user interface 710, the bus 712, and the memory 720 are optional, or more components may be included in the computing device 702.

The transmitter 706 is configured to enable the computing device 702 to send data to one or more other devices via direct connection or via one or more networks, and the receiver 708 is configured to enable the computing device 702 to receive data from one or more other devices via direct connection or via one or more networks. The one or more networks may include Institute of Electrical and Electronics Engineers (IEEE) 802 wireless networks, Bluetooth networks, telephone networks, optical or radio frequency networks, or other wired or wireless networks. In some implementations, the transmitter 706 and the receiver 708 may be replaced with a transceiver that enables sending and receipt of data from one or more other devices.

The user interface 710 is configured to facilitate user interaction. For example, the user interface 710 is adapted to receive input from a user, to provide output to a user, or a combination thereof. In some implementations, the user interface 710 conforms to one or more standard interface protocols, including serial interfaces (e.g., universal serial bus (USB) interfaces or IEEE interface standards), parallel interfaces, display adapters, audio adaptors, or custom interfaces. In some implementations, the user interface 710 is configured to communicate with one or more input/output devices, such as some combination of buttons, keyboards, pointing devices, displays, speakers, microphones, touch screens, and other devices.

The memory 720 includes volatile memory devices (e.g., random access memory (RAM) devices), nonvolatile memory devices (e.g., read-only memory (ROM) devices, programmable read-only memory, and flash memory), or both. The memory 720 is configured to store instructions 722. The processor 704 is configured to execute the instructions 722 to perform the operations described herein. To illustrate, the processor 704 may execute the instructions 722 to execute the runtime environment 112 of FIG. 1 or to update the online version of the sentence representation generation module 116 of the text classification system 100 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of updating a multi-domain sentence representation generation module of a text classification system, the computer-implemented method comprising:
   training, at one or more processors, a first multi-domain sentence representation generation module using first labeled data of a first corpus;
   after training the first multi-domain sentence representation generation module using the first labeled data, obtaining, at the one or more processors, a second corpus of second labeled data, wherein the second corpus is distinct from the first corpus;
   identifying, at the one or more processors, a subset of the first labeled data based on similarities between the first corpus and the second corpus; and
   training, at one or more processors, a second multi-domain sentence representation generation module of the text classification system using the second labeled data of the second corpus and the subset of the first labeled data; selecting, based on whether the second multi-domain sentence representation generation module satisfies an acceptance criterion, either the first multi-domain sentence representation generation module or the second multi-domain sentence representation generation module for subsequent use in the runtime environment, and wherein the acceptance criterion is satisfied when a performance metric satisfies a classification accuracy threshold.

2. The computer-implemented method of claim 1, further comprising:
   after training the first multi-domain sentence representation generation module, using the first multi-domain sentence representation generation module in a runtime environment to generate sentence representations, based on unlabeled input text samples, for multiple domain-specific text classifiers to assign classification labels to the unlabeled input text samples.

3. The computer-implemented method of claim 2, further comprising after training the second multi-domain sentence representation generation module, replacing the first multi-domain sentence representation generation module in the runtime environment with the second multi-domain sentence representation generation module.

4. The computer-implemented method of claim 2, further comprising:
   after training the second multi-domain sentence representation generation module, performing an evaluation of the second multi-domain sentence representation generation module;
   determining whether the second multi-domain sentence representation generation module satisfies the acceptance criterion based on the evaluation.

5. The computer-implemented method of claim 4, wherein the evaluation of the second multi-domain sentence representation generation module comprises using a test data set to generate the performance metric indicating classification accuracy of a first domain-specific text classifier of the multiple domain-specific text classifiers using sentence representations from the second multi-domain sentence representation generation module.

6. The computer-implemented method of claim 4, wherein the evaluation of the second multi-domain sentence representation generation module comprises:
   using a test data set to generate a first performance metric indicating classification accuracy of a first domain-specific text classifier of the multiple domain-specific text classifiers using first sentence representations from the first multi-domain sentence representation generation module; and
   using the test data set to generate a second performance metric indicating classification accuracy of the first domain-specific text classifier using second sentence representations from the second multi-domain sentence representation generation module,
   wherein the acceptance criterion is satisfied when the second performance metric is greater than or equal to the first performance metric.

7. The computer-implemented method of claim 4, wherein the evaluation of the second multi-domain sentence representation generation module comprises:
   providing the second multi-domain sentence representation generation module to a plurality of independent entities for evaluation, the plurality of independent entities associated with the multiple domain-specific text classifiers; and
   receiving, from at least a subset of entities of the plurality of independent entities, voting data indicating acceptance of or rejection of the second multi-domain sentence representation generation module.

8. The computer-implemented method of claim 7, wherein the evaluation of the second multi-domain sentence representation generation module further comprises:
   applying a first weight value to first voting data from a first entity of the plurality of independent entities to generate a first weighted vote; and
   applying a second weight value to second voting data from a second entity of the plurality of independent entities to generate a second weighted vote, the first entity distinct from the second entity and the first weight value different than the second weight value,
   wherein the acceptance criterion is satisfied when weighted voting data based on the first weighted vote and the second weighted vote satisfies an acceptance threshold.

9. The computer-implemented method of claim 8, wherein the first weight value is based on a first use metric value indicative of use of the first multi-domain sentence representation generation module in the runtime environment associated with the first entity and the second weight value is based on a second use metric value indicative of use of the first multi-domain sentence representation generation module in the runtime environment associated with the second entity.

10. The computer-implemented method of claim 1, wherein identifying the subset of the first labeled data based on the similarities between the first corpus and the second corpus comprises:
   determining first sentence representations, each sentence representation of the first sentence representations corresponding to a respective entry of the first labeled data;
   determining second sentence representations, each sentence representation of the second sentence representations corresponding to a respective entry of the second labeled data; and
   determining distances, in an embedding space, between the first sentence representations and the second sentence representations, wherein the similarities between the first corpus and the second corpus are determined based on the distances.

11. The computer-implemented method of claim 1, wherein the first corpus includes first text samples related to first semantic domains and the second corpus includes second text samples related to second semantic domains, and wherein the first and second semantic domains are not coextensive.

12. A system for updating a multi-domain sentence representation generation module of a text classification system, the system comprising:
   one or more processors; and
   one or more memory devices coupled to the one or more processors, the one or more memory devices storing instructions that are executable by the one or more processors to perform operations including:
      training a first multi-domain sentence representation generation module using first labeled data of a first corpus;
      after training the first multi-domain sentence representation generation module using the first labeled data, obtaining a second corpus of second labeled data, wherein the second corpus is distinct from the first corpus;
      identifying a subset of the first labeled data based on similarities between the first corpus and the second corpus; and
      training a second multi-domain sentence representation generation module using the second labeled data of the second corpus and the subset of the first labeled data; selecting, based on whether the second multi-domain sentence representation generation module satisfies an acceptance criterion, either the first multi-domain sentence representation generation module or the second multi-domain sentence representation generation module for subsequent use in the runtime environment, and wherein the acceptance criterion is satisfied when a performance metric satisfies a classification accuracy threshold.

13. The system of claim 12, wherein the operations further comprise:
   after training the first multi-domain sentence representation generation module, using the first multi-domain sentence representation generation module in a runtime environment to generate sentence representations, based on unlabeled input text samples, for multiple domain-specific text classifiers to assign classification labels to the unlabeled input text samples.

14. The system of claim 12, wherein the operations further comprise:
   after training the second multi-domain sentence representation generation module, performing an evaluation of the second multi-domain sentence representation generation module;
   determining whether the second multi-domain sentence representation generation module satisfies the acceptance criterion based on the evaluation.

15. The system of claim 14, wherein the evaluation of the second multi-domain sentence representation generation module comprises using a test data set to generate the performance metric indicating classification accuracy of a first domain-specific text classifier of multiple domain-specific text classifiers using sentence representations from the second multi-domain sentence representation generation module.

16. The system of claim 14, wherein the evaluation of the second multi-domain sentence representation generation module comprises:
   using a test data set to generate a first performance metric indicating classification accuracy of a first domain-specific text classifier of multiple domain-specific text classifiers using first sentence representations from the first multi-domain sentence representation generation module; and
   using the test data set to generate a second performance metric indicating classification accuracy of the first domain-specific text classifier using second sentence representations from the second multi-domain sentence representation generation module,
   wherein the acceptance criterion is satisfied when the second performance metric is greater than or equal to the first performance metric.

17. The system of claim 12, wherein the operations further comprise:
   after training the multi-domain sentence representation generation module, providing the second multi-domain sentence representation generation module to a plurality of independent entities for evaluation, the plurality of independent entities associated with multiple domain-specific text classifiers;
   receiving, from a first entity of the plurality of independent entities, first voting data indicating acceptance of or rejection of the second multi-domain sentence representation generation module;
   receiving, from a second entity of the plurality of independent entities, second voting data indicating acceptance of or rejection of the second multi-domain sentence representation generation module;
   applying a first weight value to the first voting data to generate a first weighted vote;
   applying a second weight value to the second voting data to generate a second weighted vote, the first entity distinct from the second entity and the first weight value different than the second weight value;
   determining weighted voting data based on the first weighted vote and the second weighted vote; and
   selecting, based on the weighted voting data, either the first multi-domain sentence representation generation module or the second multi-domain sentence representation generation module for subsequent use in a runtime environment.

18. The system of claim 12, wherein the operations further comprise:
   determining first sentence representations, each sentence representation of the first sentence representations corresponding to a respective entry of the first labeled data;

determining second sentence representations, each sentence representation of the second sentence representations corresponding to a respective entry of the second labeled data; and determining distances, in an embedding space, between the first sentence representations and the second sentence representations, wherein the similarities between the first corpus and the second corpus are determined based on the distances.

19. The system of claim 12, wherein the first corpus includes first text samples related to first semantic domains and the second corpus includes second text samples related to second semantic domains, and wherein the first and second semantic domains are not coextensive.

20. A computer program product for updating a multi-domain sentence representation generation module of a text classification system, the computer program product comprising a computer readable storage medium having program instructions embodied therewith, the program instructions executable by one or more processors to perform operations including:

training, at one or more processors, a first multi-domain sentence representation generation module using first labeled data of a first corpus;

after training the first multi-domain sentence representation generation module using the first labeled data, obtaining, at the one or more processors, a second corpus of second labeled data, wherein the second corpus is distinct from the first corpus;

identifying, at the one or more processors, a subset of the first labeled data based on similarities between the first corpus and the second corpus; and training, at one or more processors, a second multi-domain sentence representation generation module of the text classification system using the second labeled data of the second corpus and the subset of the first labeled data; selecting, based on whether the second multi-domain sentence representation generation module satisfies an acceptance criterion, either the first multi-domain sentence representation generation module or the second multi-domain sentence representation generation module for subsequent use in the runtime environment, and wherein the acceptance criterion is satisfied when a performance metric satisfies a classification accuracy threshold.

\* \* \* \* \*